(12) United States Patent
Yoshida

(10) Patent No.: US 6,441,925 B1
(45) Date of Patent: Aug. 27, 2002

(54) COMMUNICATION APPARATUS

(75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/436,642

(22) Filed: Nov. 9, 1999

(30) Foreign Application Priority Data

Nov. 11, 1998 (JP) ............................................ 10-320455
Nov. 11, 1998 (JP) ............................................ 10-320461

(51) Int. Cl.[7] ............................ H04N 1/00; H04N 1/40; H04N 1/04
(52) U.S. Cl. ....................... 358/438; 358/449; 358/474; 399/1
(58) Field of Search ................................ 358/400, 401, 358/434–436, 438, 468, 449, 474, 296; 399/1, 2, 364, 370, 374, 376

(56) References Cited

U.S. PATENT DOCUMENTS

| 5,282,050 A | * | 1/1994 | Ishizuka et al. | ............ 358/400 |
| 5,289,290 A | * | 2/1994 | Suzuki et al. | ............... 358/468 |
| 5,408,340 A | * | 4/1995 | Edamura | .................... 358/468 |
| 5,467,203 A |   | 11/1995 | Kawata | ...................... 358/451 |
| 5,532,847 A | * | 7/1996 | Maruyama | .................. 358/498 |
| 5,642,205 A | * | 6/1997 | Kassmann | .................. 358/436 |
| 5,815,289 A |   | 9/1998 | Yoshida et al. | ............. 358/468 |
| 5,826,133 A | * | 10/1998 | Saito et al. | ...................... 399/2 |
| 6,081,687 A | * | 6/2000 | Munemori et al. | ......... 399/374 |
| 6,275,308 B1 | * | 8/2001 | Yoshida | ...................... 358/474 |

FOREIGN PATENT DOCUMENTS

DE 43 16 809 A1 11/1993
EP 0 845 713 A1 6/1998

* cited by examiner

*Primary Examiner*—Kimberly A. Williams
(74) *Attorney, Agent, or Firm*—Fitzpatrick, Cella, Harper & Scinto

(57) ABSTRACT

The invention provides a communication apparatus capable of minimizing the division and one side recording of the two-side long original, thereby generating the received recording easy for observation by the receiving user.

In case the dual side recording is designated from the transmitting station or at the receiving station, even if the received information is judged not as the fixed size, the dual side recording is executed by reducing such received information to the fixed size. Also the maximum reduction ratio for reducing the size of the received information of a long-sized original for output in the recording sheet of a fixed size is selected differently in case the one side recording is designated and in case the dual side recording is designated, and is selected larger in case of designation of the dual side recording than in case of designation of the one side recording.

33 Claims, 15 Drawing Sheets

COMMUNICATION APPARATUS

BACKGROUND OF THE INVENTION

1. Field of the Invention

The present invention relates to a communication apparatus such as a facsimile apparatus, particularly capable of dual side recording and dual side reading.

2. Related Background Art

As an example of a conventional communication apparatus, there will be explained a facsimile apparatus.

A conventional facsimile apparatus capable of dual side recording records received information in succession on front and back sides of recording sheets, such as recording the first page of the received information on the front side of the recording sheet of first page, the second page of the received information on the back side of the recording sheet of first page, the third page of the received information on the front side of the recording sheet of second page and the fourth page of the received information oh the back side of the recording of second page.

Also the conventional facsimile apparatus capable of dual side reading simultaneously reads front and back sides of original information at one time in case the dual side reading is selected, and, in case a receiving partner station is capable of dual side recording, a transmitting station transmits the original information by designating the front and back sides and a receiving station reproduces the same images as those in the original information.

However, in case a long-sized original is received in such conventional facsimile apparatus capable of dual side recording, such original is divided and is recorded on the front side of the recording sheet of the first page and the back side thereof. In such case, if the divided portion of the long-sized original contains a table or the like, the information in such portion is dividedly recorded on the front side of the first page and the back side thereof and a user at the receiving station cannot read the information as connected, so that the received information becomes extremely inconvenient for observation by the user.

Also in the conventional facsimile apparatus capable of dual side reading, in case the original information at the transmitting station is long-sized, it is easy in the transmitting station to transmit such long-sized original by designating the front side and the back side of the original. However, since the receiving station, receiving such designated front and back sides of the original, often uses cut recording sheets, it is suffered from the following trouble. The receiving station may record the divided front side of the long-sized original on the front and back sides of the recording sheet of first page and record the divided back side of the long-sized original on the front and back sides of the recording sheet of second page, or may record the divided front side of the long-sized original on the front side of the recording sheets of first and second pages and records the divided back side of the long-sized original on the back side of the recording sheets of first and second pages. But, in either case the recorded information is quite inconvenient for observation for the user at the receiving station.

Also in the conventional facsimile apparatus capable of dual side recording, the received information is always recorded on two sides in case the dual side recording for the received information is selected at the receiving station. Such operation mode is based on an assumption that the received information during one communication is of one size only.

In the conventional facsimile apparatus, however, the original size at the transmitting station is not unique but may mixedly include A4, B4, A3 sizes and even a long-sized original.

The receiving station does not contemplate proper control for receiving and recording such originals but executes dual side recording in unique manner so that the received information may not be recorded in appropriate manner.

SUMMARY OF THE INVENTION

In consideration of the foregoing, an object of the present invention is to provide a communication apparatus capable of minimizing division and single side recording for dual side long-sized original, thereby providing the user at the receiving station with easily observable received original.

Another object of the present invention is to provide a communication apparatus capable of proper recording operation in case the received information contains different sizes during one communication.

DETAILED DESCRIPTION OF THE PREFERRED EMBODIMENTS

[First Embodiment]

Figure 1:
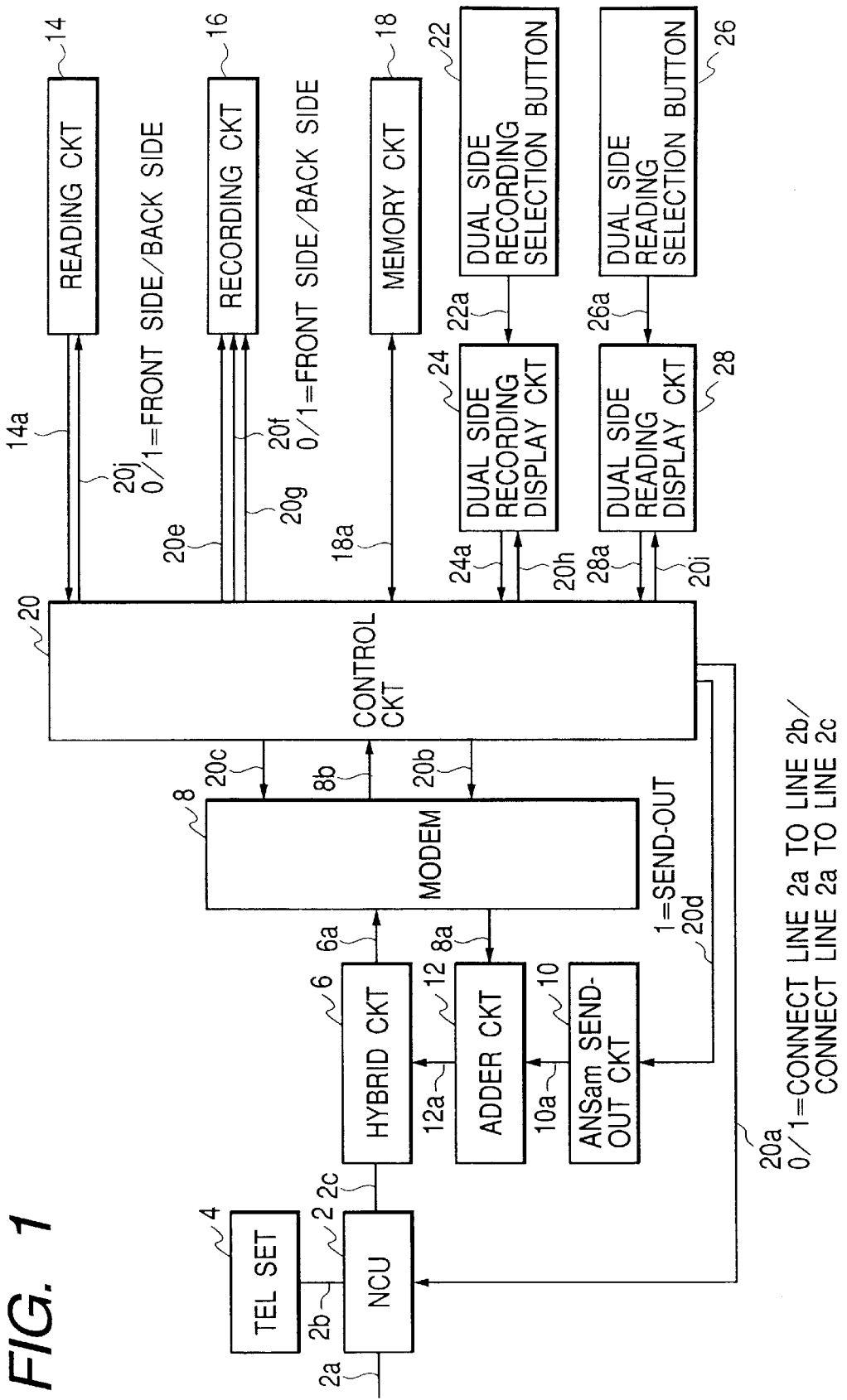
FIG. 1 is a block diagram showing the configuration of a first embodiment of the present invention.
Figure 2:
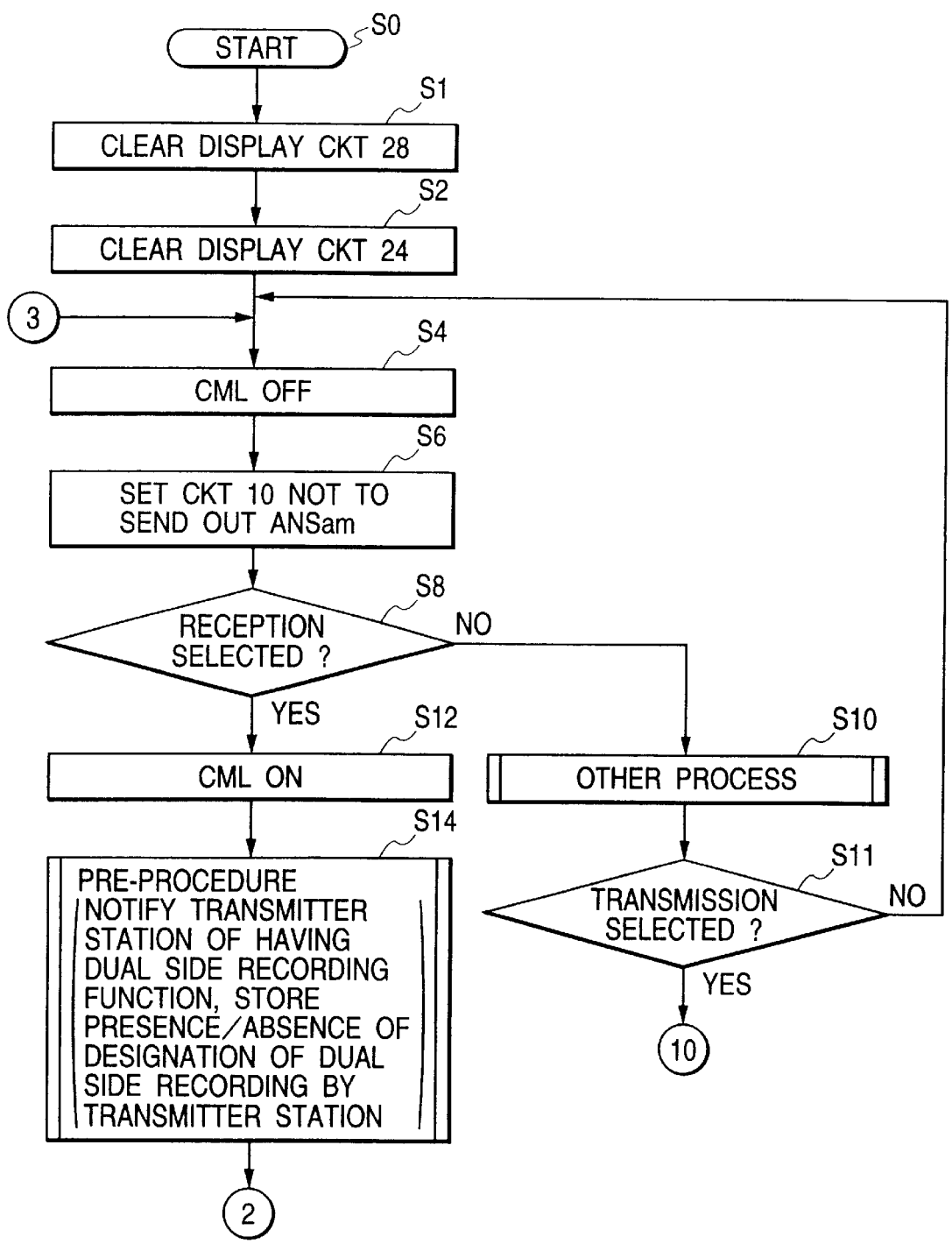
FIGS. 2, 3, 4, 5, 6, 7 and 8 are flow charts showing the function of the first embodiment.
Figure 3:
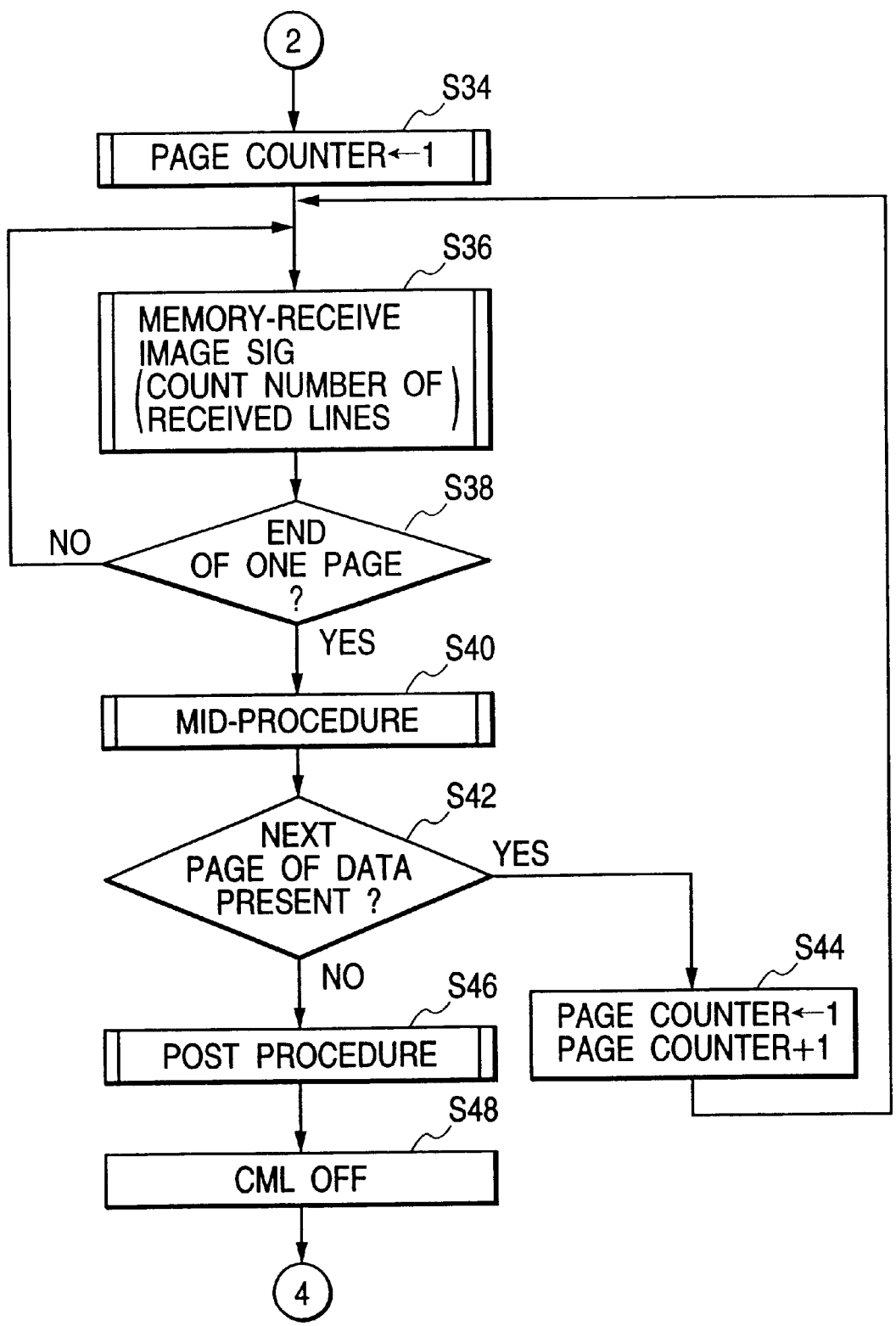
Figure 4:
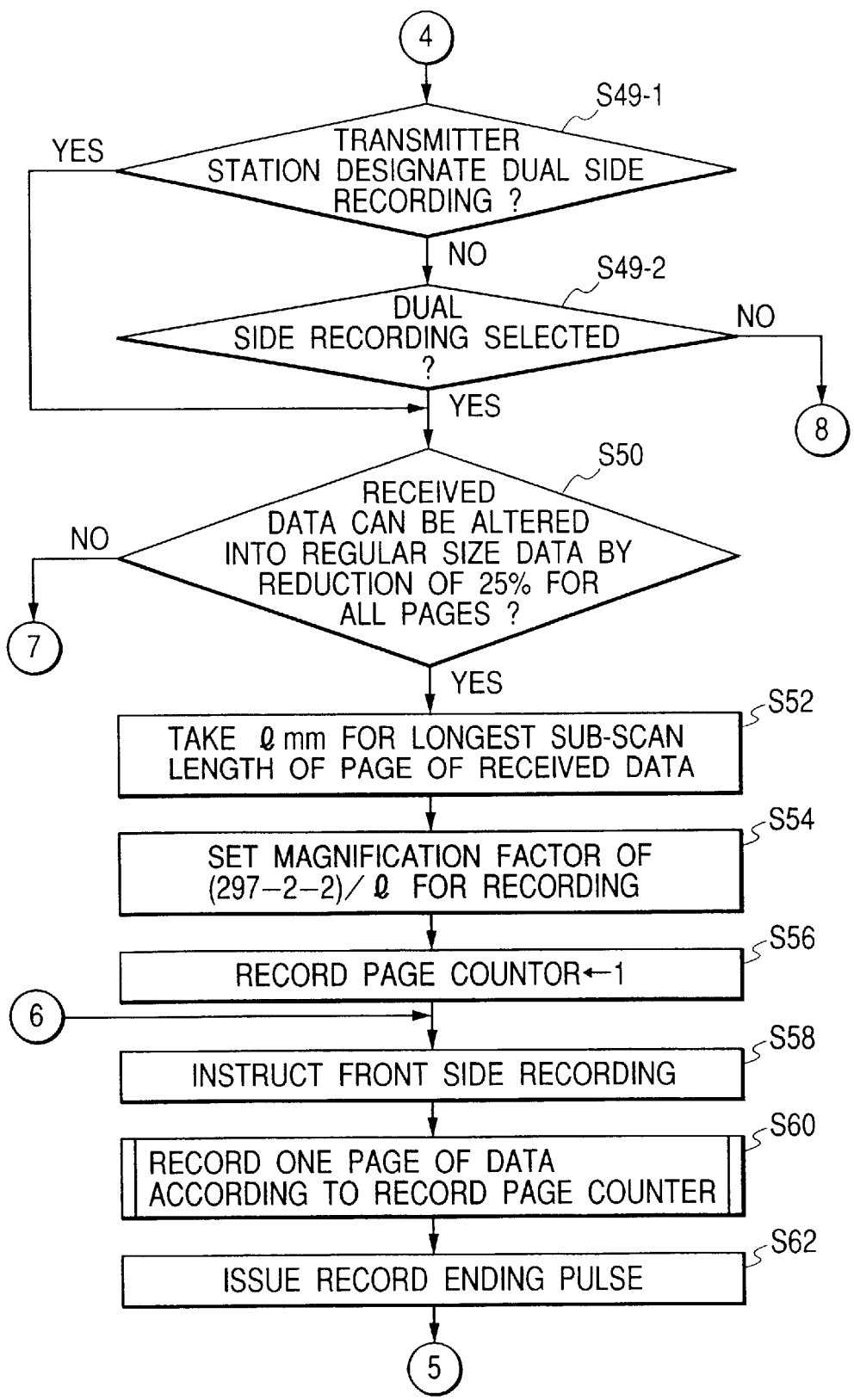
Figure 5:
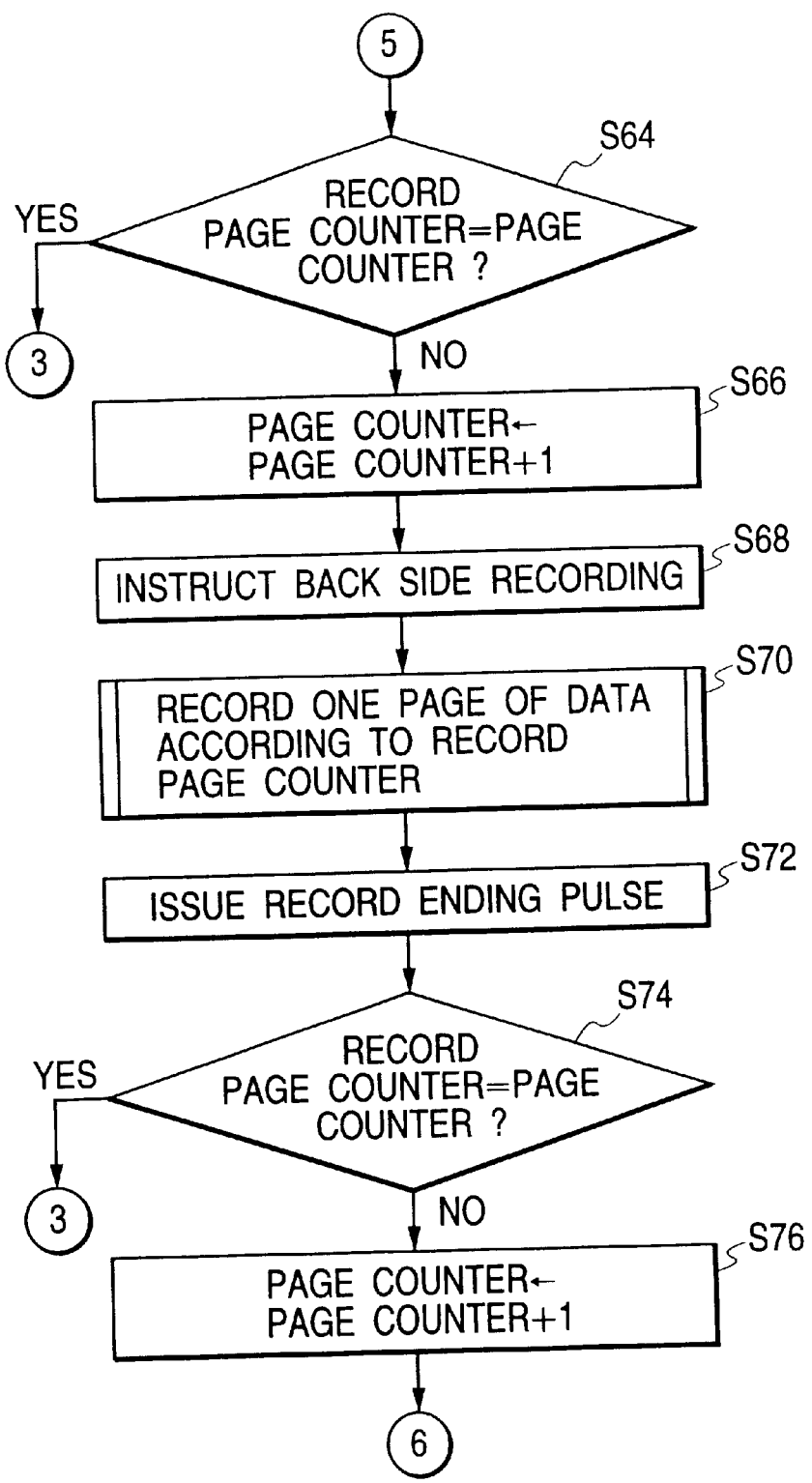
Figure 6:
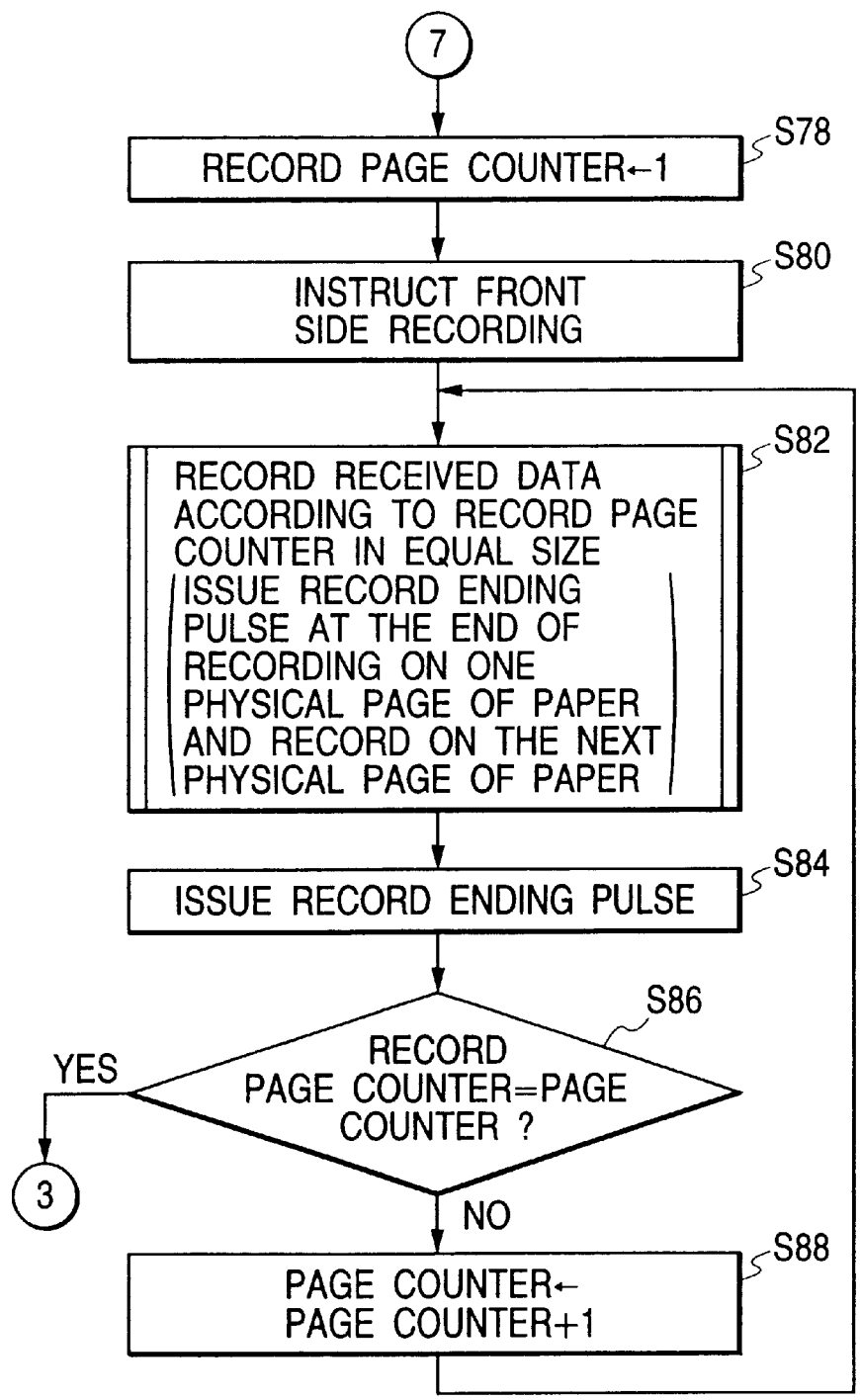

FIG. 1 is a block diagram showing the configuration of a facsimile apparatus constituting a first embodiment of the present invention.

An NCU (network control unit) 2 is connected to a terminal connected to a line of a telephone network to execute connection control on a switched telephone network, perform switching to a data communication path, and maintain a loop, thereby utilizing the telephone network for data communication. The NCU 2 connects a telephone line 2a to a telephone set 4 or a facsimile apparatus according as the signal level on a signal line 20a from a control circuit 20 is "0" or "1". In the normal state, the telephone line 2a is connected to the telephone set 4.

A hybrid circuit 6 separates transmission signals and reception signals, and transmits the transmission signal from an adder circuit 12 to the telephone line 2a through the NCU 2 and receives the signal from a partner station through the NCU 2 for supply to a modem 8 through a signal line 6a.

A modem 8 executes modulation and demodulation based on the ITU-T recommendations V.8, V.21, V.27ter, V.29, V.17 and V.34, and each transmission mode is designated by a signal line 20c. The modem 8 receives a signal outputted on a signal line 20b and outputs modulated data to a signal line 8a, and also receives a reception signal outputted on the signal line 6a and outputs demodulated data to a signal line 8b.

An ANSam transmission circuit 10, for transmitting an ANSam signal, transmits the ANSam signal or none to a signal line 10a according as the signal on a signal line 20d is at a level "1" or "0".

The adder circuit 12 receives the signals of the signal lines 8a and 10a and outputs the result of addition to a signal line 12a. A reading circuit 14 reads the front side or back side of the original according as the signal on a signal line 20i is at a level "0" or "1", and sends the read image data to a signal line 14a.

A recording circuit 16 records, line by line, the information outputted on a signal line 20e. The recording circuit 16 has a function of dual side recording on a recording sheet of a fixed size (fixed-size recording sheet of A4 is contemplated in the following description), and executes recording on the front side or back side of the recording sheet according as a signal of a level "0" or "1" is supplied on a signal line 20f. Also the recording of one page is terminated when a recording end pulse is generated on the signal line 20f.

A memory circuit 18 is used for storing the raw or encoded information of the read data, and the received or decoded information.

A dual side recording selection button 22 is to be used by the user for selecting the dual side recording of the received information, and, generates a depression pulse on a signal line 22a when depressed.

A dual side recording display circuit 24, for displaying the selection of the dual side recording, assumes a state of "no display of dual side recording" upon generation of a clear pulse on a signal line 20h, and thereafter repeats states of "display of dual side recording" and "no display of dual side recording" in response to depression pulses generated on the signal line 22a. The display circuit 24 outputs a signal of a level "1" or "0" on a signal line 24a according as it is in the "display of dual side recording" or "no display of dual side recording" state.

A dual side reading selection button 26 is to be used by the user for selecting the dual side reading of the transmission information, and, generates a depression pulse on a signal line 26a when depressed.

A dual side reading display circuit 28, for displaying the selection of the dual side reading, assumes a state of "no display of dual side reading" upon generation of a clear pulse on a signal line 20i, and thereafter repeats states of "display of dual side reading" and "no display of dual side reading" in response to depression pulses generated on a signal line 28a. The display circuit 28 outputs a signal of a level "1" or "0" on the signal line 28a according as it is in the "display of dual side reading" or "no display of dual side reading" state.

The control circuit 20 controls the entire facsimile apparatus of the present embodiment, and is provided, particularly in the present embodiment, with a function of detecting the designation of dual side recording from the transmitting partner station, a function of arbitrarily varying the magnification of the received information, and a function of discriminating whether the received information is information of a fixed size.

In case the dual side recording is designated from the transmitting partner station or selected by the dual side recording selection button 22, there is executed dual side recording in the fixed size by reducing the size of the detected received information even if it is of non-fixed size.

More specifically, in case one side recording is designated, a long-sized original is reduced up to a size reduction ratio of 90% to discriminate whether it is the fixed size, and, in case dual side recording is designated, a long-sized original is reduced up to a size reduction ratio of 25% to discriminate whether it is the fixed size.

FIGS. 2 to 8 are flow charts showing the control sequence of the control circuit 20 of the present embodiment.

At first a step S0 starts the sequence, then a step S1 generates a clear pulse on the signal line 20i to set the dual side reading display circuit 28 in the non-display state, and a step S2 generates a clear pulse on the signal line 20h to set the dual side recording display circuit 24 in the non-display state.

A step S4 outputs a signal of a level "0" on the signal line 20a to turn off the CML, and a step S6 outputs a signal of a level "0" on the signal line 20d not to transmit the ANSam signal.

A step S8 discriminates whether the reception is selected, and, if selected, the sequence proceeds to a step S12, but, if not selected, the sequence proceeds to a step S10 for executing another process and then to a step S11. A step S11 discriminates whether the transmission is selected, and, the sequence proceeds to a step S104 or the step S4 according as the transmission is selected or not.

A step S12 outputs a signal of a level "1" on the signal line 20a for turning on the CML. A step S14 executes a pre-procedure, thereby informing the presence of the dual side recording function and memorizing the presence or absence of designation for the dual side recording from the transmitting partner station. The sequence thereafter proceeds to a step S34.

The step S34 sets "1" in a page counter. A step S36 executes memory reception of the image signal, counting the reception line numbers corresponding to the content of the page counter.

A step S38 discriminates whether the reception of a page has been completed, and, if not, the sequence proceeds to the step S36, but, if completed, the sequence proceeds to a step S40 for executing an intermediate procedure.

A step S42 discriminates whether the information of a next page is present, and, if present, the sequence proceeds to a step S44 for increasing the value of the page counter by one and then to a step S36. On the other hand, if the next page is absent, the sequence proceeds to a step S46 for executing a post-procedure. Then a step S48 outputs a signal of a level "0" to the signal line 20a to turn off the CML.

A step S49-1 discriminates whether the dual side recording is designated from the transmitting station, based on the information of the pre-procedure of the step S14, and, the sequence proceeds to a step S50 or S49-2 according as the dual side recording is designated or not.

A step S49-2 enters the information of the signal line 24a to discriminate whether the dual side recording is selected, and the sequence proceeds to a step S50 or S90 according as the dual side recording is selected or not.

Then the step S50 discriminates, based on the received line number corresponding to the page counter, whether all the received information can be reduced to the fixed size by a reduction ratio of 25%, and the sequence proceeds to a step S52 or S78 according as the received can be reduced to the fixed size or not.

The step S52 sets the length of the longest page information in the sub scanning direction among the received information as 1 mm, and a step S54 sets 2 mm as the non-printing length at each of the upper and lower ends, thereby setting the recording with a magnification (297−2−2)/l. If the magnification exceeds l, the magnification is set at 1. A step S56 sets "1" in a recording page counter.

A step S58 outputs a signal of a level "0" on the signal line 20f, thereby designating recording on the "front side". A step S60 executes recording of the page information of a page in the recording page counter, and a step S62 outputs a page recording end pulse on the signal line 20g.

Then a step S64 discriminates whether the value of the recording page counter is same as that of the page counter, and the sequence proceeds to the step S4 or S66 according as these values are same or not.

The step S66 increases the value of the recording page counter by one. A step S68 outputs a signal of a level "1" to the signal line 20f, thereby designating recording on the "back side". A step S70 records the page information of a page of the recording page counter, and a step S72 outputs a page recording end pulse on the signal line 20g.

Then a step S74 discriminates whether the value of the recording page counter is same as that of the page counter, and, if same, the sequence proceeds to the step S4, but, if not same, the sequence proceeds to a step S76 for increasing the value of the recording page counter by one and then to the step S58. The step S78 in FIG. 6 sets "1" in the recording page counter. A step S80 outputs a signal of a level "0" on the signal line 20f, thereby designating recording on the "front side".

A step S82 recording the page information of the recording page counter in the original size. When the recording of a physical page on the recording sheet is completed, a recording end pulse is generated on the signal line 20g, and the next physical page is recorded on the recording sheet. (Thus the page information exceeding the length of the recording sheet is recorded in divided manner.) A step S84 generates a page recording end pulse on the signal line 20g.

Then a step S86 discriminates whether the value of the recording page counter is same as that of the page counter, and, if same, the sequence proceeds to the step S4, but, if not same, the sequence proceeds to a step S88 for increasing the value of the recording page counter by one and then to the step S82.

Figure 7:
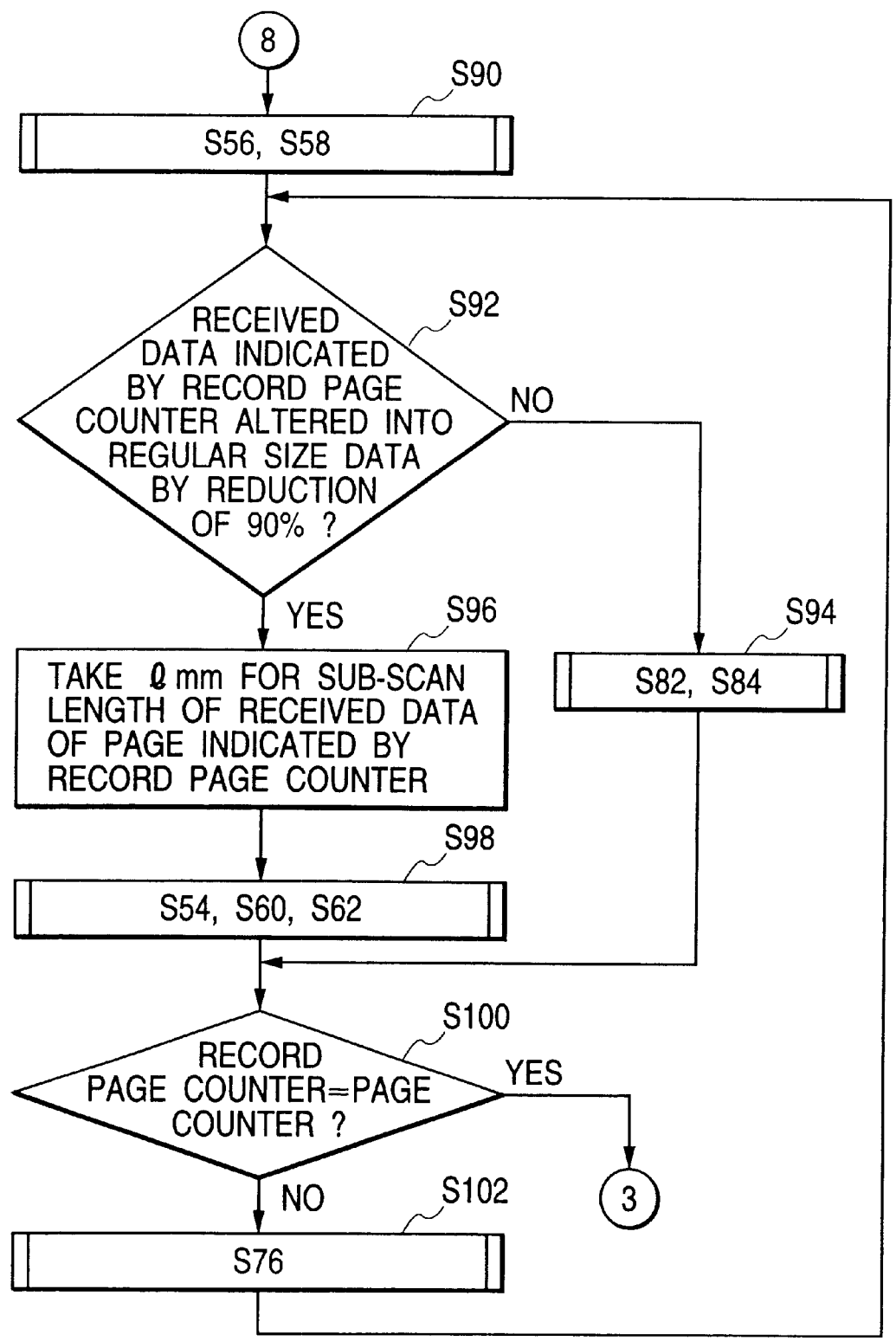

A step S90 in FIG. 7, in the same manner as the steps S56 and S58, sets "1" in the recording page counter and outputs a signal of a level "0" on the signal line 20f thereby designating recording on the "front side".

A step S92 discriminates whether the received information of the page number of the recording page counter can be reduced to the fixed size with a reduction ratio of 90%, and, if reducible to the fixed size, the sequence proceeds to a step S96, but, if not, the sequence proceeds to a step S94 for executing processes same as those of the steps S82 and S84, namely recording the page information of the recording page counter with the original size and generating the recording end pulse.

The step S96 sets the length of the page number of the recording page counter as 1mm. A step S98 executes processes same as those in the steps S54, S60 and S62, namely setting 2 mm as the non-printing length at each of the upper and lower ends, thereby setting the recording with a magnification (297−2−2)/l, recording the page information of a page in the recording page counter and generating a page recording end pulse.

A step S100 discriminates whether the value of the recording page counter is same as that of the page counter, and, if same, the sequence proceeds to the step S4, but, if not same, the sequence proceeds to a step S102 for executing a process same as that of the step S76, namely for increasing the value of the recording page counter by one, and then to the step S92.

Figure 8:
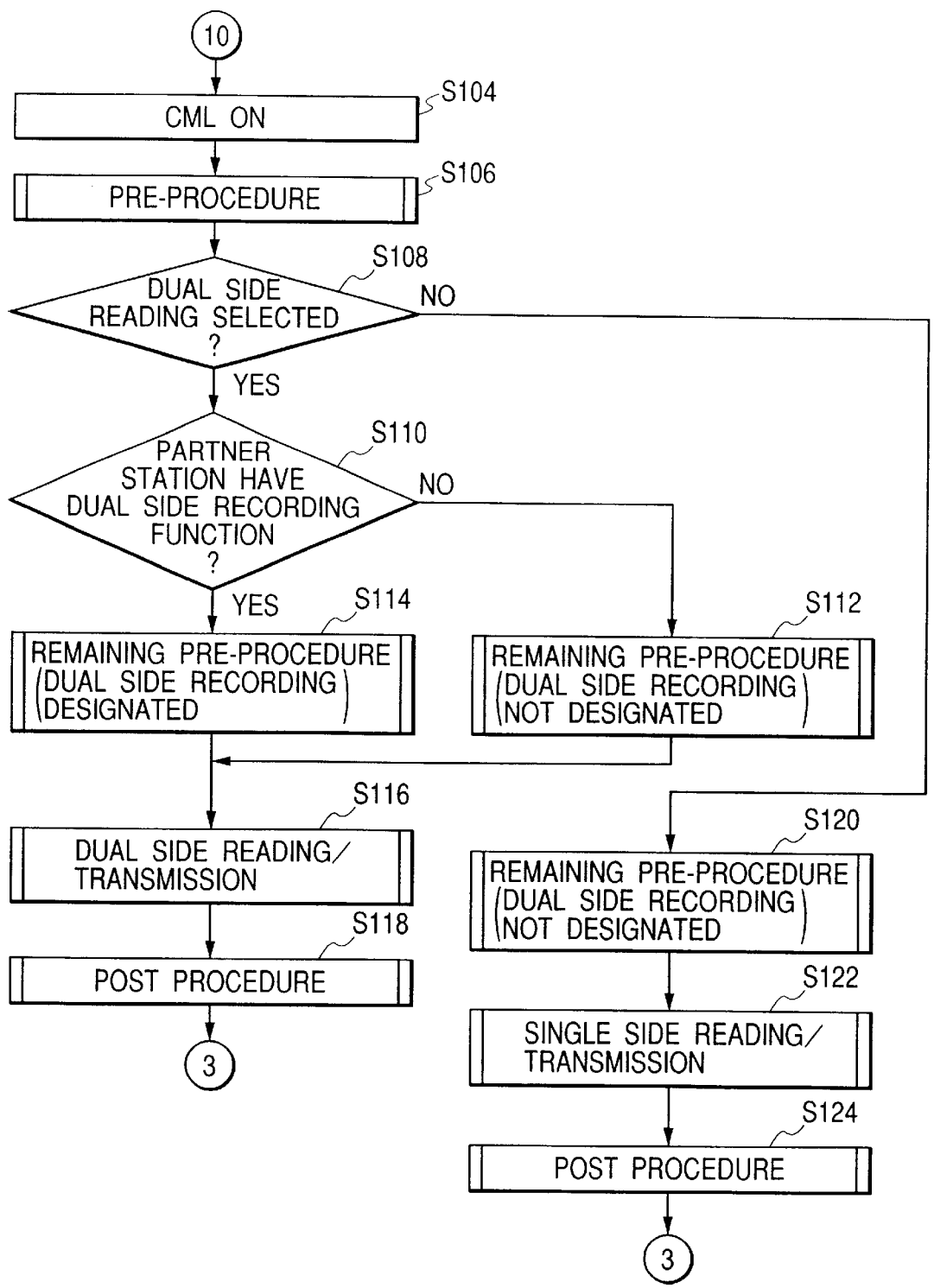

A step S104 in FIG. 8 outputs a signal of a level "1" on the signal line 20a, thereby turning on the CML, and a step S106 executes a pre-procedure. Then a step S108 enters the information of the signal line 28a for discriminating whether the dual side reading is selected, and the sequence proceeds to a step S110 or S120 according as the dual side reading is selected or not.

A step S110 discriminates whether the dual side recording function is available in the partner station, and, if available, the sequence proceeds to a step S114 for executing a remaining pre-procedure for designating the dual side recording, but, if not available, the sequence proceeds to a step S112 for executing a remaining pre-procedure for not designating the dual side recording. Thereafter a step S116 executes dual side reading/transmission of the image signal, then a step S118 executes a post-procedure, and the sequence proceeds to the step S4.

A step S120 executes a remaining pre-procedure for not designating the dual side recording, then a step S122 executes one side reading/transmission of the image signal, a step S124 executes a post-procedure and the sequence proceeds to the step S4.

In the foregoing explanation, the functions of the control circuit are executed by a CPU therein based on a program stored in a ROM or a RAM therein, but the present invention may also be attained by storing such program in an external memory medium such as a floppy disk, a hard disk, an optical disk, a CD-ROM or a memory card, fetching such program into the control circuit by an exclusive reading device and executing it by the CPU in the control unit.

Also the foregoing embodiment has been explained by a facsimile apparatus of stand-alone type, but the present invention is not limited to such embodiment and is likewise applicable to the control of data communication in a comprehensive data processing system in which copying function, electronic filing function, data processing function etc. are combined with the communicating function.

As explained in the foregoing, the present invention provides an apparatus capable, in the execution of dual side recording, of securely recording the received information of a page in the recording sheet of the fixed size, thereby providing easily observable information and enabling effective utilization of the recording sheets though the recorded image may appear somewhat smaller.

Also, if the original to be dual side recorded is divided because of a larger length and is one side recorded, the resulting image becomes inconvenient for observation. The present invention therefore allows to increase the maximum reduction ratio in order to reduce the size of the information thereby enabling dual side recording and avoiding the divided recording as far as possible, whereby the recording is executed in such a manner as to avoid inconvenience resulting from the division of the received information as far as possible.

[Second Embodiment]

In the second embodiment, components same as those in the first embodiment will be represented by same numbers and will not be explained further.

Figure 9:
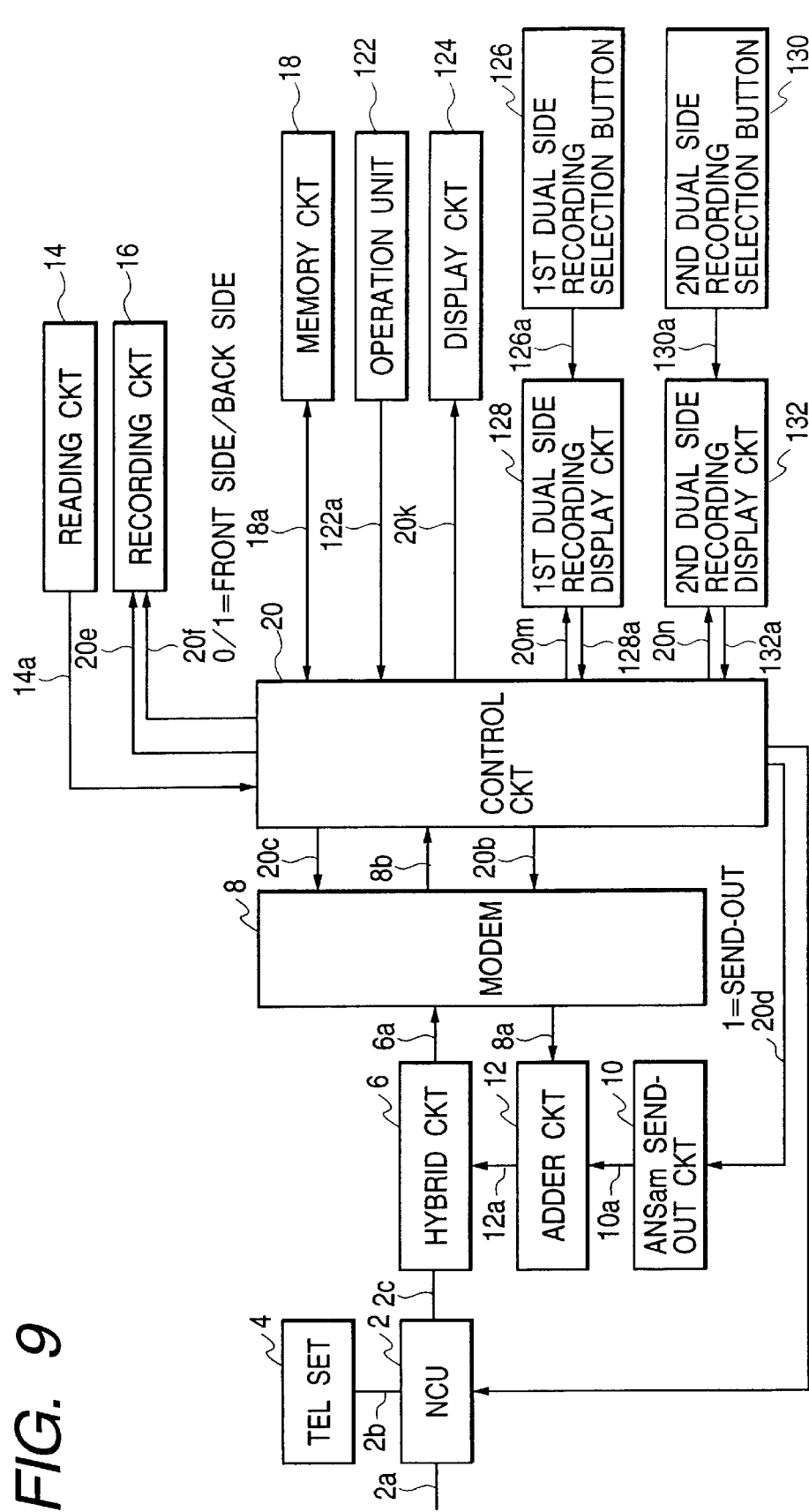
FIG. 9 is a block diagram showing the configuration of a second embodiment of the present invention.

FIG. 9 is a block diagram showing the configuration of a facsimile apparatus constituting a second embodiment of the present invention.

An operation unit 122 is provided with a one-touch dial, a contacted number dial, numeral keys, "*" and "#" keys, a start key, a set key, a stop key, and other function keys, and outputs the information of a depressed key to a signal line 22a. A display circuit 124 enters and displays the information outputted on a signal line 20k.

A first dual side recording selection button 126 is to be depressed in case of selecting the dual side recording, and, upon depression, generates a depression pulse on a signal line 126a.

A first dual side recording display circuit 128 assumes a state of "no display" upon generation of a clear pulse on a signal line 20m, and thereafter repeats states of "display" and "no display" in response to depression pulses generated on the signal line 126a. The display circuit 128 outputs a signal of a level "1" or "0" on a signal line 128a according as it is in the "display" or "no display" state.

A second dual side recording selection button 130 is to be depressed in case the dual side recording is selected and the dual side recording is selected for different reception sizes, and, upon depression, generates a depression pulse on a signal line 130a.

A second dual side recording display circuit 132, for displaying the selection of the dual side recording for different reception sizes in case the dual side recording is selected, assumes a state of "no display" upon generation of a clear pulse on a signal line 20n, and thereafter repeats states of "display" and "no display" in response to depression pulses generated on the signal line 130a. The display circuit 132 outputs a signal of a level "1" or "0" on a signal line 128a according as it is in the "display" or "no display" state.

In the present embodiment, the control circuit 20 executes memory reception of the reception information of a communication when the dual side recording is selected by the first and second dual side recording selection buttons 126, 130, and controls the recording of the received information according to the preset conditions.

In case there is selected to execute the dual side recording for the received information of different sizes, the dual side recording is executed by suitably varying the magnification of the received information of different sizes into the information of a same size, but, in case there is selected not to execute the dual side recording for the received information of different sizes, there is executed one side recording in which each received original is recorded on the recording sheet of an appropriate size. Also in case the dual side recording is not executed despite of selection of the dual side recording by the first dual side recording selection button 126, there is also executed control for displaying the reason therefor by the display circuit 124.

FIGS. 10 to 13 are flow charts showing the control sequence of the control circuit 20 of the present second embodiment.

Figure 10:
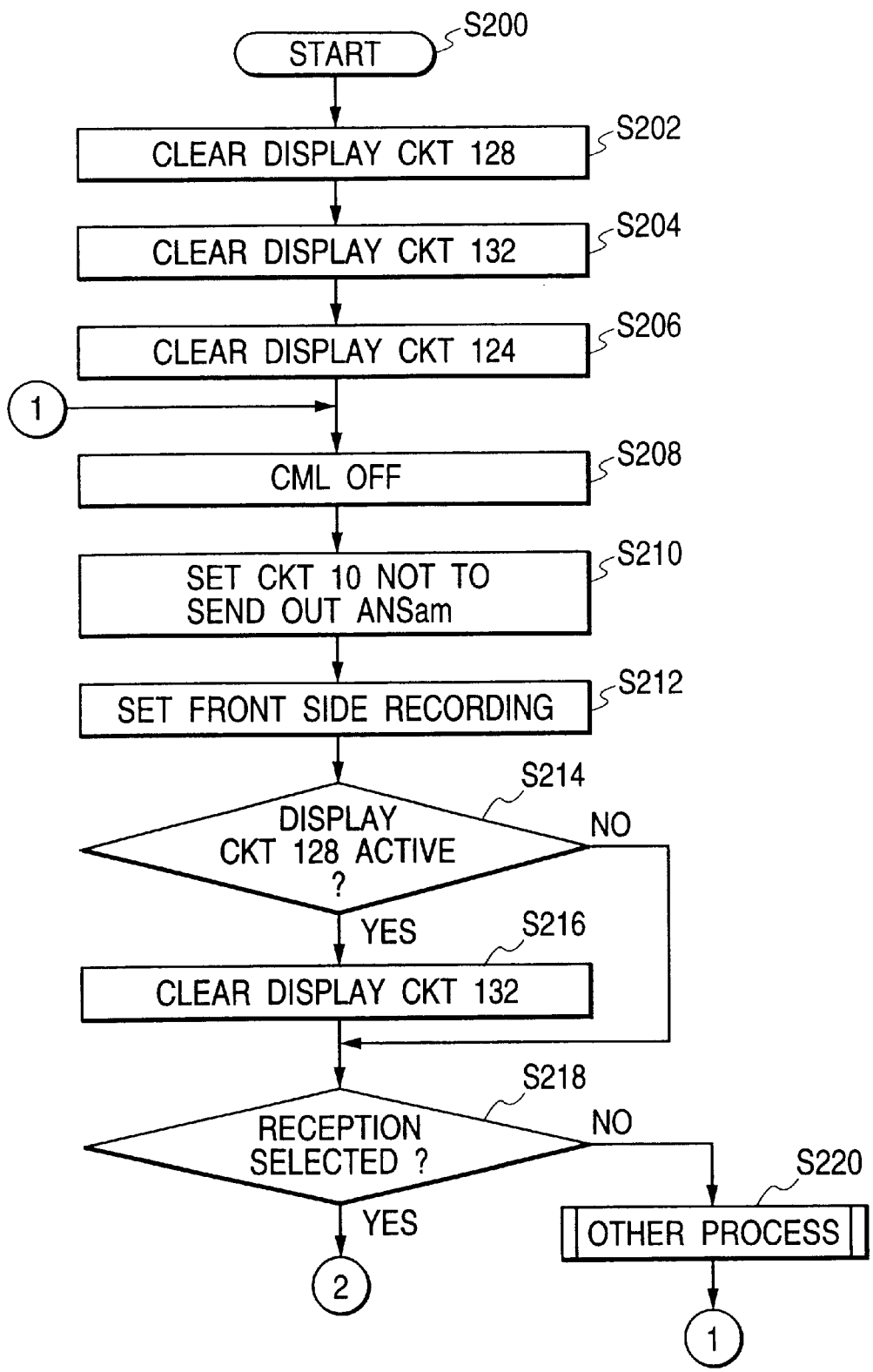
FIGS. 10, 11, 12 and 13 are flow charts showing the function of the second embodiment.
Figure 11:
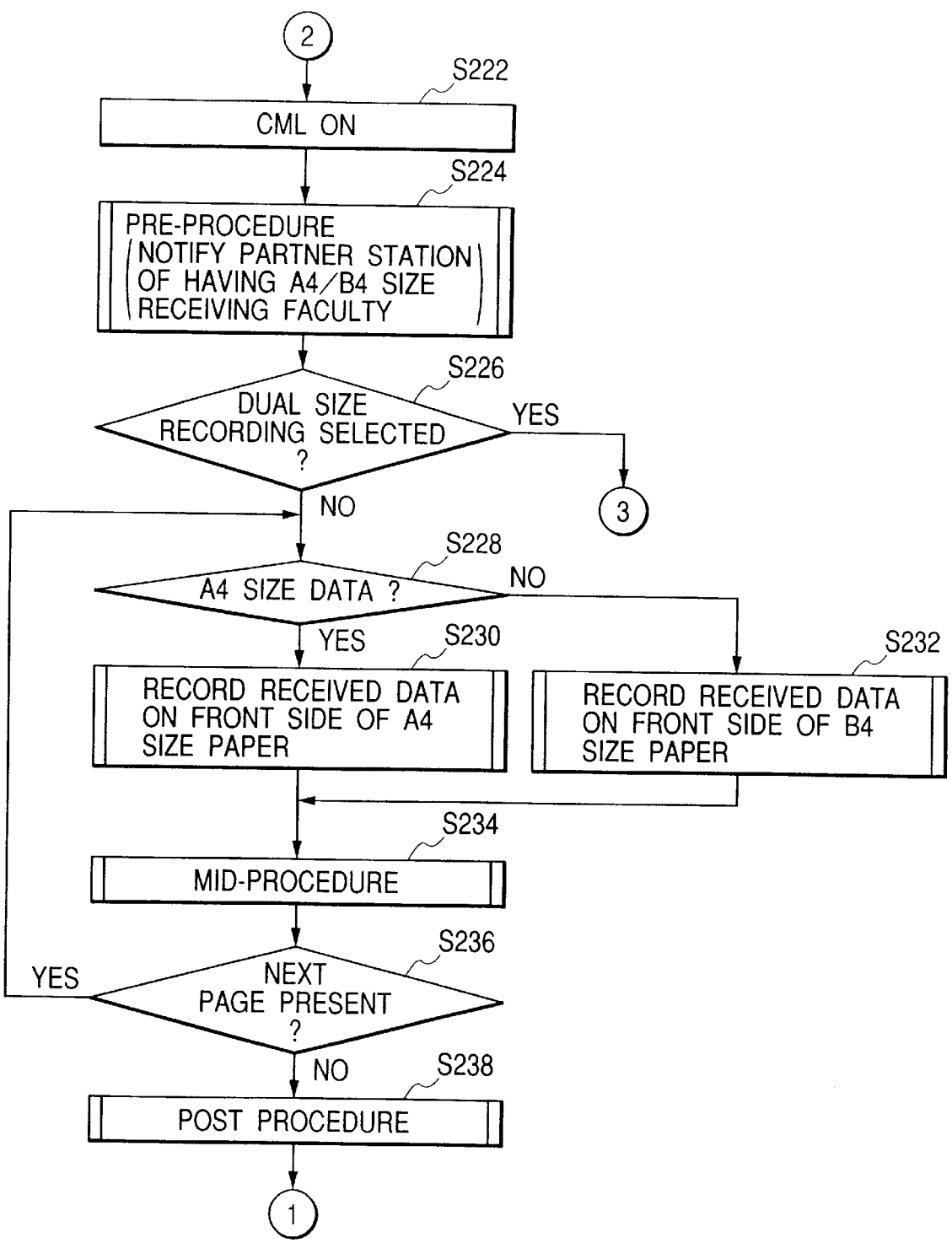
Figure 12:
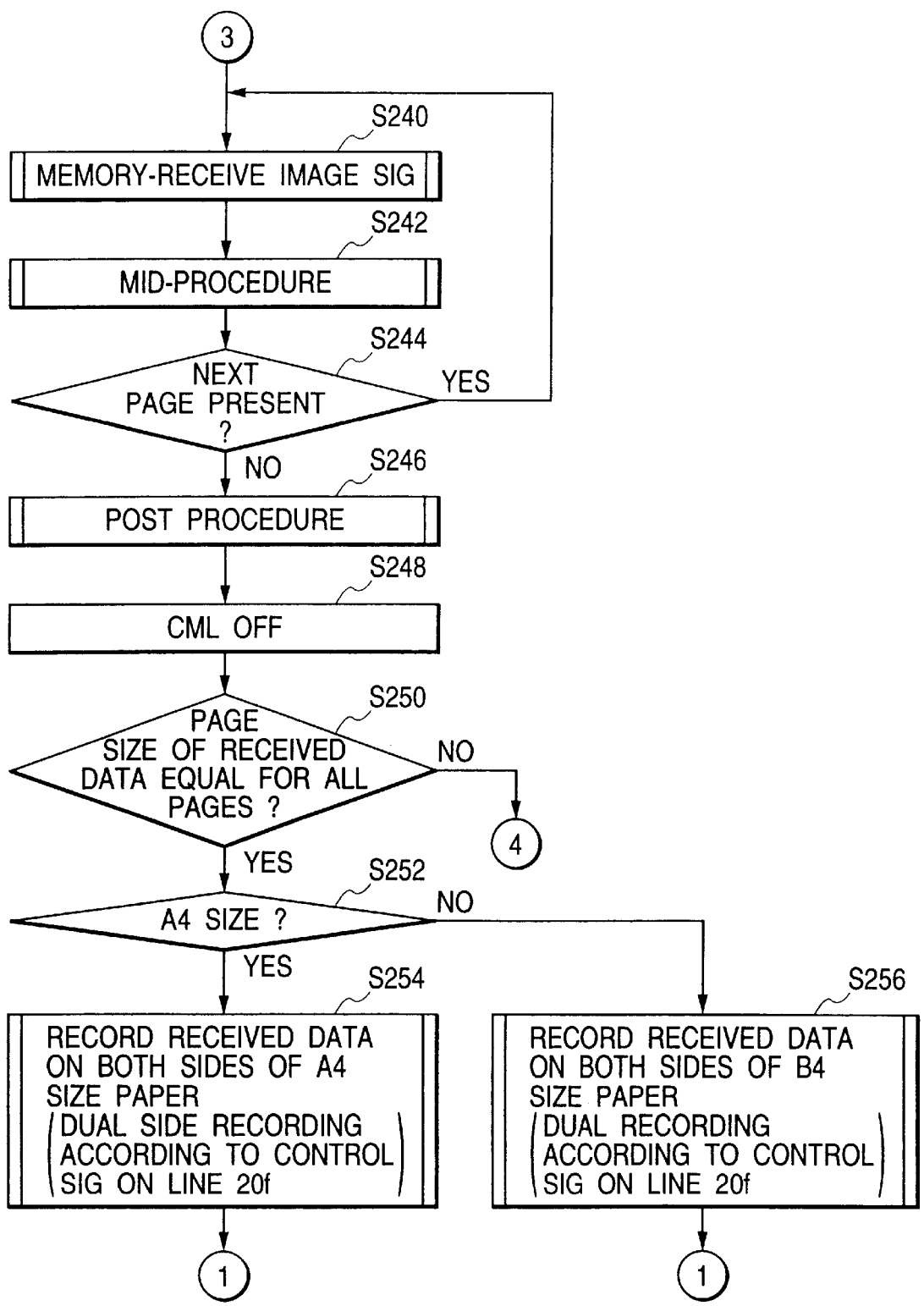
Figure 13:
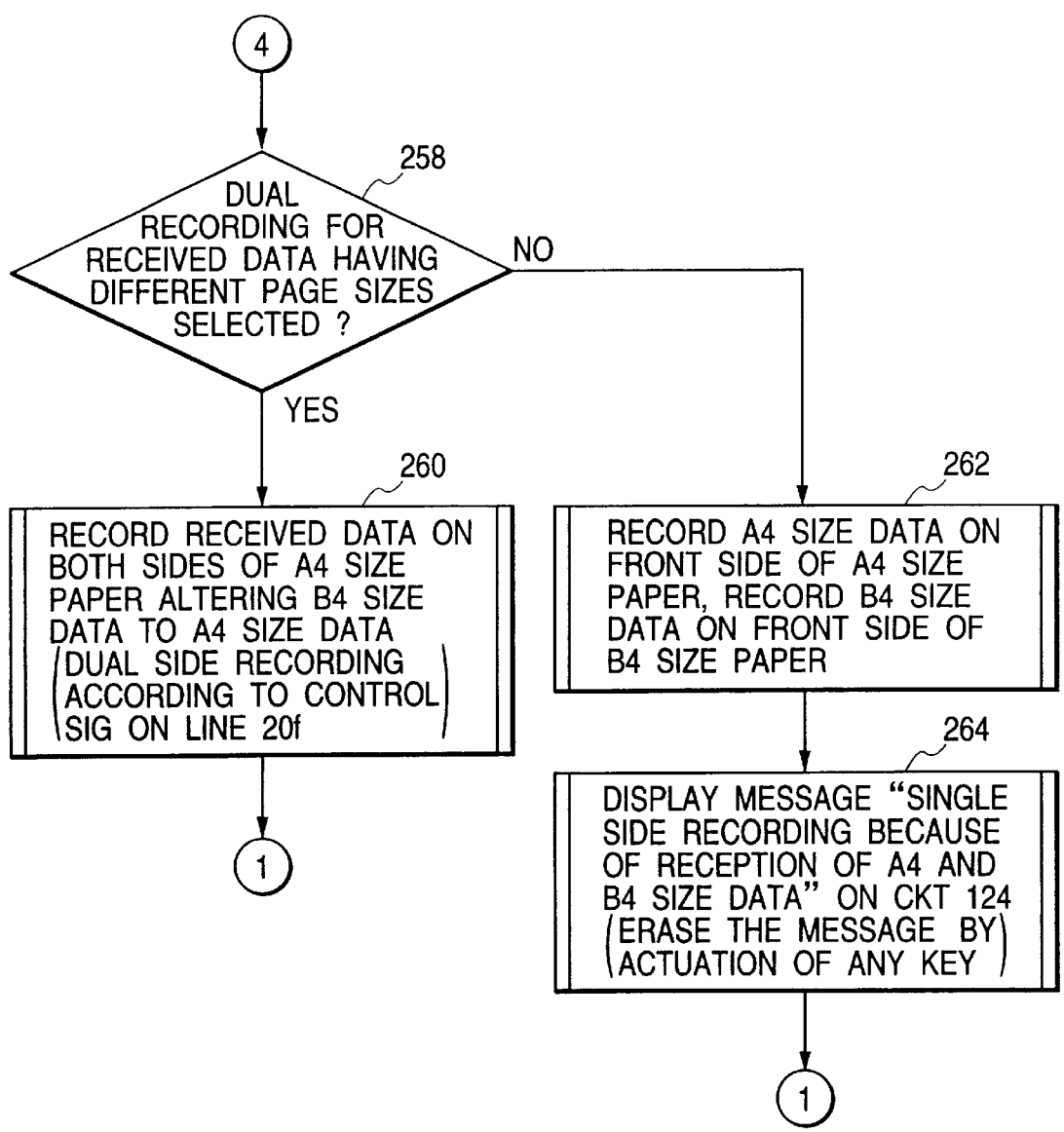

Referring to FIG. 10, a step S200 starts the sequence, and a step S202 generates a clear pulse on the signal line 20m, thereby setting the first dual side recording display circuit 128 in the no-display state. A step S204 generates a clear pulse on the signal line 20n, thereby setting the second dual side recording display circuit 132 in the no-display state. A step S206 sets the display circuit 124, through the signal line 20k, in the no-display state.

A step S208 outputs a signal of a level "0" on the signal line 20a, thereby turning off the CML. A step S210 outputs a signal of a level "0" on the signal line 20d, thereby not transmitting the ANSam signal. A step S212 outputs a signal of a level "0" on the signal line 20f, thereby setting the front side recording in the recording circuit 16.

Then a step S214 enters the information of the signal line 128a for discriminating whether the dual side recording display circuit 128 is in the display state, and, if in the display state, the sequence proceeds to a step S218, but, if not, the sequence proceeds to a step S216 for generating a clear pulse on the signal line 20n thereby setting the second dual side recording display circuit 132 in the no-display state. Then the sequence proceeds to a step S218. The step S218 discriminates whether the reception is selected, and, if selected, the sequence proceeds to a step S222, but, if not selected, the sequence proceeds to a step S220 for executing another process.

A step S222 outputs a signal of a level "1" on the signal line 20a for turning on the CML, and a step S224 execute a pre-procedure. In this step there is declared the receiving ability for A4 and B4 sizes in the main scanning direction.

Then a step S226 enters the information of the signal line 128a for discriminating whether the dual side recording is selected, and the sequence proceeds to a step S240 or S228 according as the dual side recording is selected or not.

A step S228 discriminates the size of transmission, and the sequence proceeds to a step S230 or S232 according as the transmission is A4 size or B4 size in the main scanning direction.

The step S230 records the received information on the front side of a recording sheet of A4 size. Also the step S232 records the received information on the front side of a recording sheet of B4 size.

Then a step S234 executes an intermediate procedure. A step S236 discriminates whether a next page is present, and, if present, the sequence proceeds to the step S228, but, if absent, the sequence proceeds to a step S238 for executing a post-procedure and then to the step S208.

A step S240 executes memory reception of the image signal. A step S242 executes an intermediate procedure, and a step S244 discriminates whether a next page is present, and, if present, the sequence proceeds to the step S240, but, if absent, the sequence proceeds to a step S246 for executing a post-procedure and then to a step S248.

The step S248 outputs a signal of a level "0" on the signal line 20a for turning off the CML. A step S250 discriminates whether all the received pages are same in size in the main scanning direction, and the sequence proceeds to a step S252 or S258 according as the pages are same or not in the size.

The step S252 discriminates whether the received size is A4 in the main scanning direction, and the sequence proceeds to a step S254 or S256 according as the received size is A4 or B4.

The step 254 executes dual side recording of the received information on a recording sheet of A4 size, under the control by the signal line 20f, and then the sequence proceeds to the step S208. The step S256 executes dual side recording of the received information on a recording sheet of B4 size, under the control by the signal line 20f, and then the sequence proceeds to the step S208.

A step S258 enters the information of the signal line 132a for discriminating whether the dual side recording is selected for different reception sizes, and the sequence proceeds to a step S260 or S262 according as such dual side recording is selected or not.

The step S260 reduces the received information B4 size into the information of A4 size and executes dual side recording on a recording sheet of A4 size under the control of the signal line 20f. Thereafter the sequence proceeds to the step S208.

A step S262 executes recording of the received information of A4 size on a recording sheet of A4 size and the received information of B4 size on a recording sheet of B4 size, on the front side only.

A step S264 causes the display circuit 124, through the signal line 20k, to display that the one side recording is executed because the received information includes A4 and B4 sizes. This display is erased by any key operation of the operator.

As explained in the foregoing, the received information is one side or dual side recorded according to the setting by the first and second selection button 126, 130.

[Third Embodiment]

In the following there will be explained a third embodiment of the present invention.

The third embodiment is, in a facsimile apparatus capable of dual side recording, to detect the length of the received information in the sub scanning direction, and to execute one side recording even if the dual side recording is selected, in case the sub scanning length exceeds a predetermined value.

Figure 14:
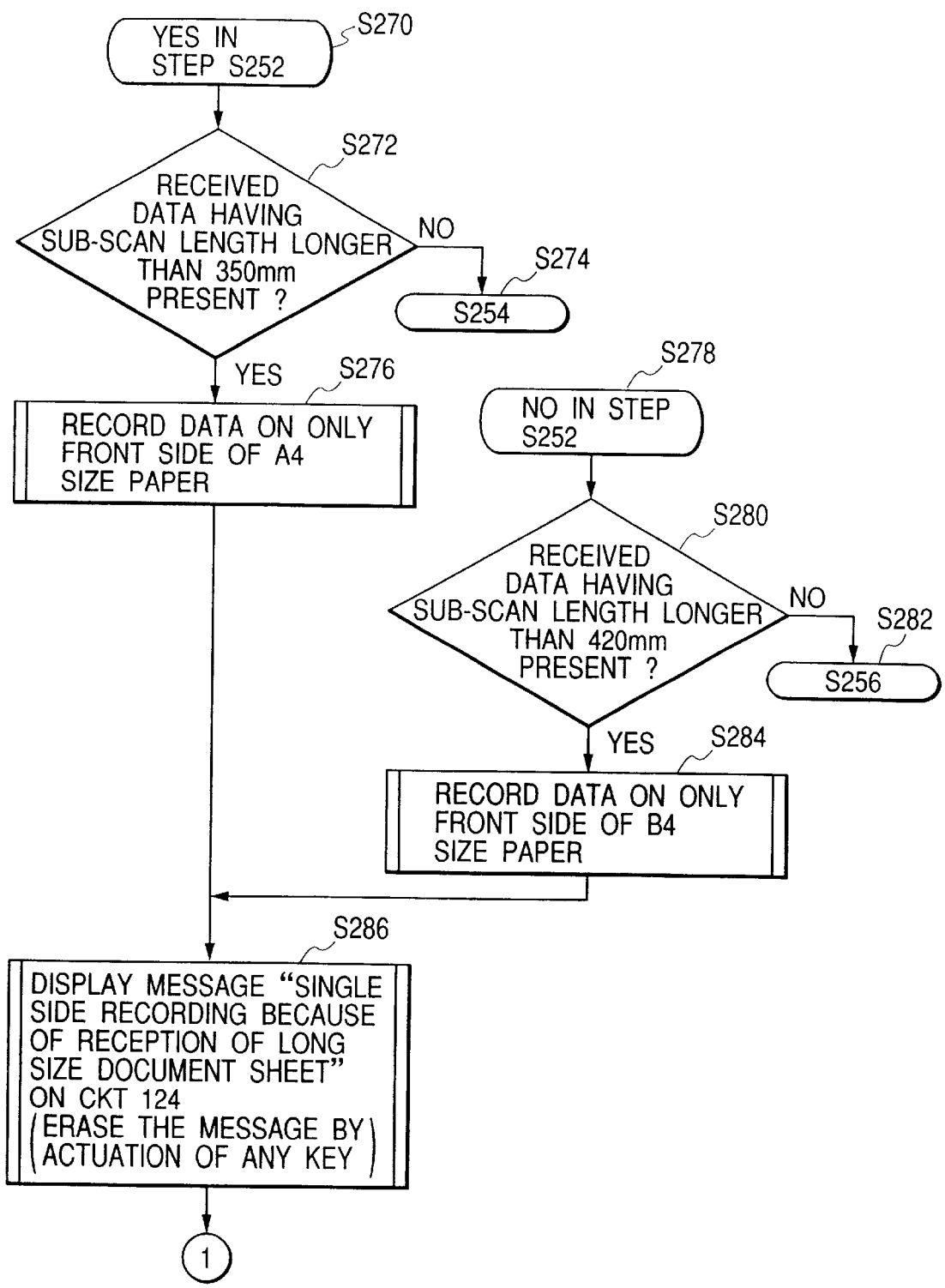
FIGS. 14 and 15 are flow charts showing the function of a third embodiment.
Figure 15:
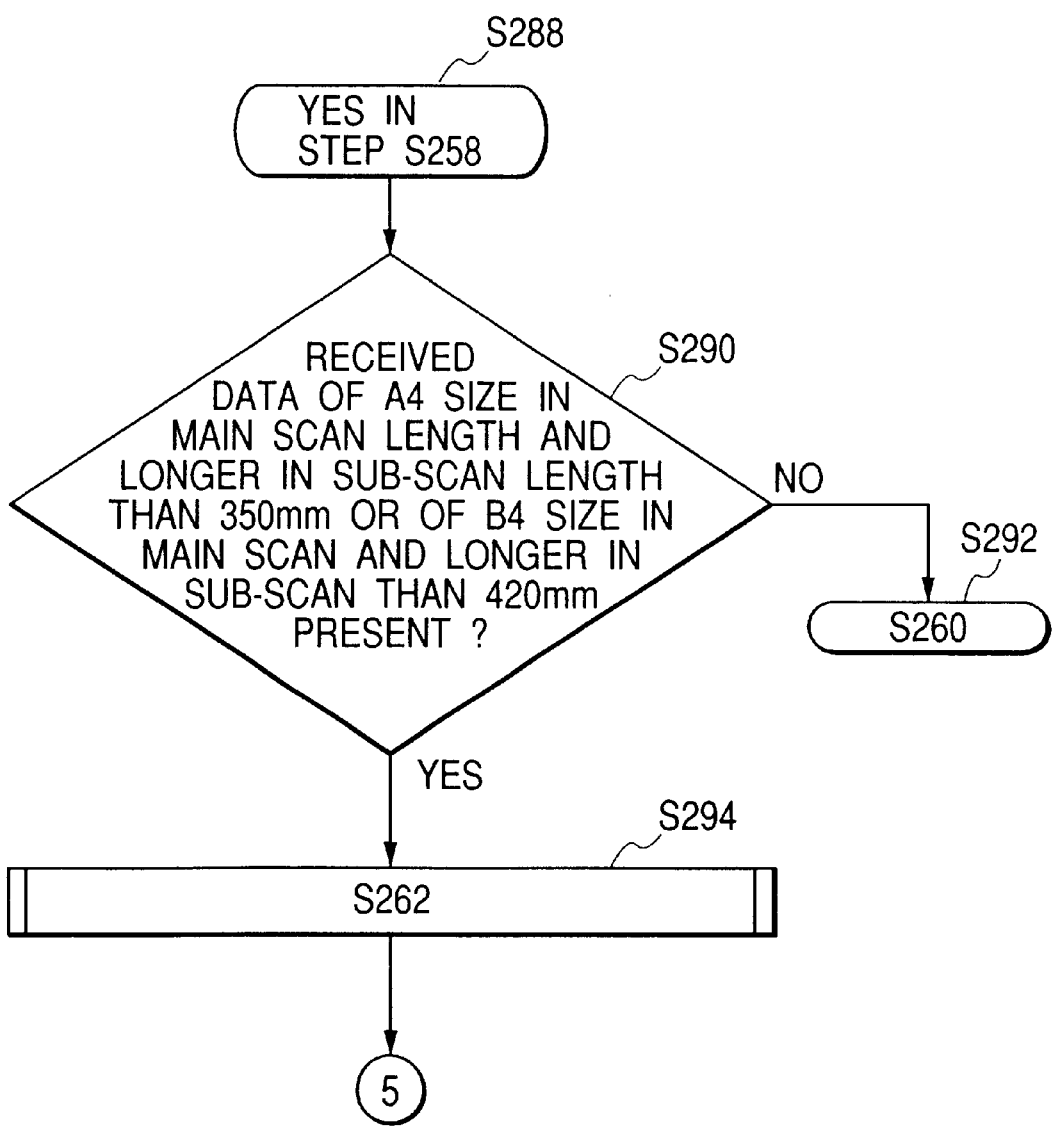

FIGS. 14 and 15 are flow charts showing, among the functions of the control circuit 20 of the present third embodiment, portions different from the control sequence of the foregoing second embodiment (shown in FIGS. 10 to 13). The configuration of the apparatus of the present embodiment is assumed same as that shown in FIG. 9.

At first the aforementioned step S240 counts the sub scanning length of the received information. In FIG. 14, a step S270 corresponds to the YES branch of the step S252. Then a step S272 discriminates whether there is present the received information of a sub scanning length exceeding 350 mm, and, if the result is affirmative, the sequence proceeds to a step S276 for recording the received information on the front side only of a recording sheet of A4 size, but, if negative result, the sequence proceeds to a step S274 (S254).

A step S278 corresponds to the NO branch of the step S252. Then a step S280 discriminates whether there is present the received information of a sub scanning length exceeding 420 mm, and, if the result is negative, the sequence proceeds to a step S282 (S256).

On the other hand, if the result is affirmative, the sequence proceeds to a step S284 for recording the received information on the front side only of a recording sheet of B4 size, and then a step S286 causes the display circuit 124, through the signal line 20k, to display that the one side recording is executed because the long-sized original is received. This display is erased by any key operation of the operator.

Referring to FIG. 15, a step S288 corresponds to the YES branch of the step S258. A step S290 discriminates whether there is present the received information having a main scanning length of A4 size and a sub scanning length exceeding 350 mm or the received information having a main scanning length of B4 size and a sub scanning length exceeding 420 mm, and the sequence proceeds to a step S294 (S262) or S292 (S260) according as the result is affirmative or negative.

In the foregoing explanation, the functions of the control circuit are executed by a CPU therein based on a program stored in a ROM or a RAM therein, but the present invention may also be attained by storing such program in an external memory medium such as a floppy disk, a hard disk, an optical disk, a CD-ROM or a memory card, fetching such program into the control circuit by an exclusive reading device and executing it by the CPU in the control unit.

Also the foregoing embodiment has been explained by a facsimile apparatus of stand-alone type, but the present invention is not limited to such embodiment and is likewise applicable to the control of data communication in a comprehensive data processing system in which copying function, electronic filing function, data processing function etc. are combined with the communicating function.

As explained in the foregoing, in case the information received within a communication includes different sizes when the dual side recording is selected, the present invention executes recording the received information according to the preset condition, thereby avoiding inappropriate recording resulting from uniform dual side recording. More specifically, the user is allowed to select either to appropriately reduce the size of the received information of different sizes and to execute the dual-size recording in a matched size, or to execute the one side recording of the received information in the original size, thereby being enabled to obtain the reception with the recording operation matching the desire of the user.

Also according to the present invention, in case the execution of the dual side recording is selected and if any long-sized original is contained in the received information, there is executed the one side recording whereby the user can be given the reception easy for observation by the user.

Also according to the present invention, in case the operator selects the dual side recording of the facsimile received information and if such dual side recording is not possible, the operator can recognize the reason therefor, so that the apparatus is extremely easy to use for the operator.

What is claimed is:

1. A communication apparatus comprising:
    recording means for selectively executing single side recording or dual side recording of received information on a recording sheet;
    detection means for detecting a designation for the dual side recording from a transmitting station;
    selection means for selecting whether or not to execute the dual side recording based on an operation of an operator;
    magnification varying means for arbitrarily varying a magnification of the received information;
    discrimination means for discriminating whether the received information is information of a fixed size; and
    control means for, in a case in which said detection means detects designation of the dual side recording from the transmitting station or said selection means selects the dual side recording, even if said discrimination means identifies that the received information is not information of the fixed size, reducing a size of the received information to the fixed size and executing the dual side recording thereof.

2. A communication apparatus according to claim 1, wherein a maximum reduction ratio for reducing the size of the received information of a long-sized original for output onto a recording sheet of the fixed size, instead of a divided output, is selected differently in a case in which the single side recording is designated and in a case in which the dual side recording is designated.

3. A communication apparatus according to claim 2, wherein the maximum reduction ratio is selected to be larger in a case in which the single side recording is designated than in a case in which the dual side recording is designated.

4. A communication apparatus according to claim 3, wherein said communication apparatus is a facsimile apparatus.

5. A communication apparatus with a function for performing dual side recording of received information of a communication, comprising:
    first selection means for selecting whether or not to execute the dual side recording of the received information;
    second selection means for selecting whether or not to execute the dual side recording in a case in which the received information includes information of different sizes; and
    recording control means for, in a case in which the dual side recording is selected by at least one of said first selection means and said second selection means, executing memory reception of the received information,
    wherein, in a case in which the received information includes information of different sizes, either the dual side recording or a single side recording of the received information is executed according to the selection by said second selection means.

6. A communication apparatus according to claim 5, wherein:

in a case in which said second selection means selects to execute the dual side recording for the received information that includes information of different sizes, the dual side recording is executed by varying a magnification of any of the received information in order to adjust the received information to produce information of a same size; and in a case in which said second selection means selects not to execute the dual side recording for the received information that includes information of different sizes, each section of the received information is single side recorded on a respective recording sheet of an appropriate size.

7. A communication apparatus according to claim 5 or 6, further comprising display control means for, in a case in which the dual side recording is selected but is not executed, displaying a reason therefor.

8. A communication apparatus according to claim 5 or 6, wherein said communication apparatus is a facsimile apparatus.

9. A communication apparatus with a function for performing dual side recording of received information, comprising:

detection means for detecting a length of the received information in a sub scanning direction; and recording control means for, in a case in which said detection means detects that the length of the received information in the sub scanning direction exceeds a predetermined length, executing single side recording even if dual side recording is selected for the received information.

10. A communication apparatus according to claim 9, wherein said communication apparatus is a facsimile apparatus.

11. A communication apparatus according to claim 9, further comprising dual side recording selection means for selecting the dual side recording, wherein, in a case in which said detection means detects that the length of the received information in the sub scanning direction exceeds a predetermined length, the single side recording is executed even if the dual side recording is selected by said dual side recording selection means.

12. A communication apparatus comprising:

a recording unit adapted to selectively execute single side recording or dual side recording of received information on a recording sheet;

a detection unit adapted to detect a designation for the dual side recording from a transmitting station;

a selection unit adapted to select whether or not to execute the dual side recording based on an operation of an operator;

a magnification varying unit adapted to arbitrarily vary a magnification of the received information;

a discrimination unit adapted to discriminate whether the received information is information of a fixed size; and a control unit adapted, in a case in which said detection unit detects designation of the dual side recording from the transmitting station or said selection unit selects the dual side recording, even if said discrimination unit identifies that the received information is not information of the fixed size, to reduce a size of the received information to the fixed size and to execute the dual side recording thereof.

13. A communication apparatus according to claim 12, wherein a maximum reduction ratio for reducing the size of the received information of a long-sized original for output onto a recording sheet of the fixed size, instead of a divided output, is selected differently in a case in which the single side recording is designated and in a case in which the dual side recording is designated.

14. A communication apparatus according to claim 13, wherein the maximum reduction ratio is selected to be larger in a case in which the single side recording is designated than in a case in which the dual side recording is designated.

15. A communication apparatus according to claim 14, wherein said communication apparatus is a facsimile apparatus.

16. A communication apparatus with a function for performing dual side recording of received information of a communication, comprising:

a first selection unit adapted to select whether or not to execute the dual side recording of the received information;

a second selection unit adapted to select whether or not to execute the dual side recording in a case in which the received information includes information of different sizes; and a recording control unit adapted, in a case in which the dual side recording is selected by at least one of said first selection unit and said second selection unit, to execute memory reception of the received information, wherein, in a case in which the received information includes information of different sizes, either the dual side recording or a single side recording of the received information is executed according to the selection by said second selection unit.

17. A communication apparatus according to claim 16, wherein:

in a case in which said second selection unit selects to execute the dual side recording for the received information that includes information of different sizes, the dual side recording is executed by varying a magnification of any of the received information in order to adjust the received information to produce information of a same size; and in a case in which said second selection unit selects not to execute the dual side recording for the received information that includes information of different sizes, each section of the received information is single side recorded on a respective recording sheet of an appropriate size.

18. A communication apparatus according to claim 16 or 17, further comprising a display control unit adapted, in a case in which the dual side recording is selected but is not executed, to display a reason therefor.

19. A communication apparatus according to claim 16 or 17, wherein said communication apparatus is a facsimile apparatus.

20. A communication apparatus with a function for performing dual side recording of received information, comprising:

a detection unit adapted to detect a length of the received information in a sub scanning direction; and a recording control unit adapted, in a case in which said detection unit detects that the length of the received information in the sub scanning direction exceeds a predetermined length, to execute single side recording even if dual side recording is selected for the received information.

21. A communication apparatus according to claim 20, wherein said communication apparatus is a facsimile apparatus.

22. A communication apparatus according to claim 20, further comprising a dual side recording selection unit adapted to select the dual side recording, wherein, in a case in which said detection unit detects that the length of the received information in the sub scanning direction exceeds a predetermined length, the single side recording is executed even if the dual side recording is selected by said dual side recording selection unit.

23. A communication method of a communication apparatus, comprising:

a recording step of selectively executing single side recording or dual side recording of received information on a recording sheet;

a detection step of detecting a designation for the dual side recording from a transmitting station;

a selection step of selecting whether or not to execute the dual side recording based on an operation of an operator;

a magnification varying step of arbitrarily varying a magnification of the received information;

a discrimination step of discriminating whether the received information is information of a fixed size; and a control step of, in a case in which said detection step detects designation of the dual side recording from the transmitting station or said selection step selects the dual side recording, even if said discrimination step identifies that the received information is not information of the fixed size, reducing a size of the received information to the fixed size and executing the dual side recording thereof.

24. A communication method according to claim 23, wherein a maximum reduction ratio for reducing the size of the received information of a long-sized original for output onto a recording sheet of the fixed size, instead of a divided output, is selected differently in a case in which the single side recording is designated and in a case in which the dual side recording is designated.

25. A communication method according to claim 24, wherein the maximum reduction ratio is selected to be larger in a case in which the single side recording is designated than in a case in which the dual side recording is designated.

26. A communication method according to claim 25, wherein the communication apparatus is a facsimile apparatus.

27. A communication method of a communication apparatus with a function for performing dual side recording of received information of a communication, comprising:

a first selection step of selecting whether or not to execute the dual side recording of the received information;

a second selection step of selecting whether or not to execute the dual side recording in a case in which the received information includes information of different sizes; and a recording step of, in a case in which the dual side recording is selected in at least one of said first selection step and said second selection step, executing memory reception of the received information, wherein, in a case in which the received information includes information of different sizes, either the dual side recording or a single side recording of the received information is executed according to the selection in said second selection step.

28. A communication method according to claim 27, wherein:

in a case in which said second selection step selects to execute the dual side recording for the received information that includes information of different sizes, the dual side recording is executed by varying a magnification of any of the received information in order to adjust the received information to produce information of a same size; and in a case in which said second selection step selects not to execute the dual side recording for the received information that includes information of different sizes, each section of the received information is single side recorded on a respective recording sheet of an appropriate size.

29. A communication method according to claim 27 or 28, further comprising a display control step of, in a case in which the dual side recording is selected but is not executed, displaying a reason therefor.

30. A communication method according to claim 27 or 28, wherein the communication apparatus is a facsimile apparatus.

31. A communication method of a communication apparatus with a function for performing dual side recording of received information, comprising:

a detection step of detecting a length of the received information in a sub scanning direction; and a recording control step of, in a case in which said detection step detects that the length of the received information in the sub scanning direction exceeds a predetermined length, executing single side recording even if dual side recording is selected for the received information.

32. A communication method according to claim 31, wherein the communication apparatus is a facsimile apparatus.

33. A communication method according to claim 31, further comprising a dual side recording selection step of selecting the dual side recording, wherein, in a case in which said detection step detects that the length of the received information in the sub scanning direction exceeds a predetermined length, the single side recording is executed even if the dual side recording is selected in said dual side recording selection step.

* * * * *